(No Model.)
H. SCHULZE-BERGE.
METHOD OF REMOVING MOLTEN GLASS FROM POTS.
No. 421,620. Patented Feb. 18, 1890.
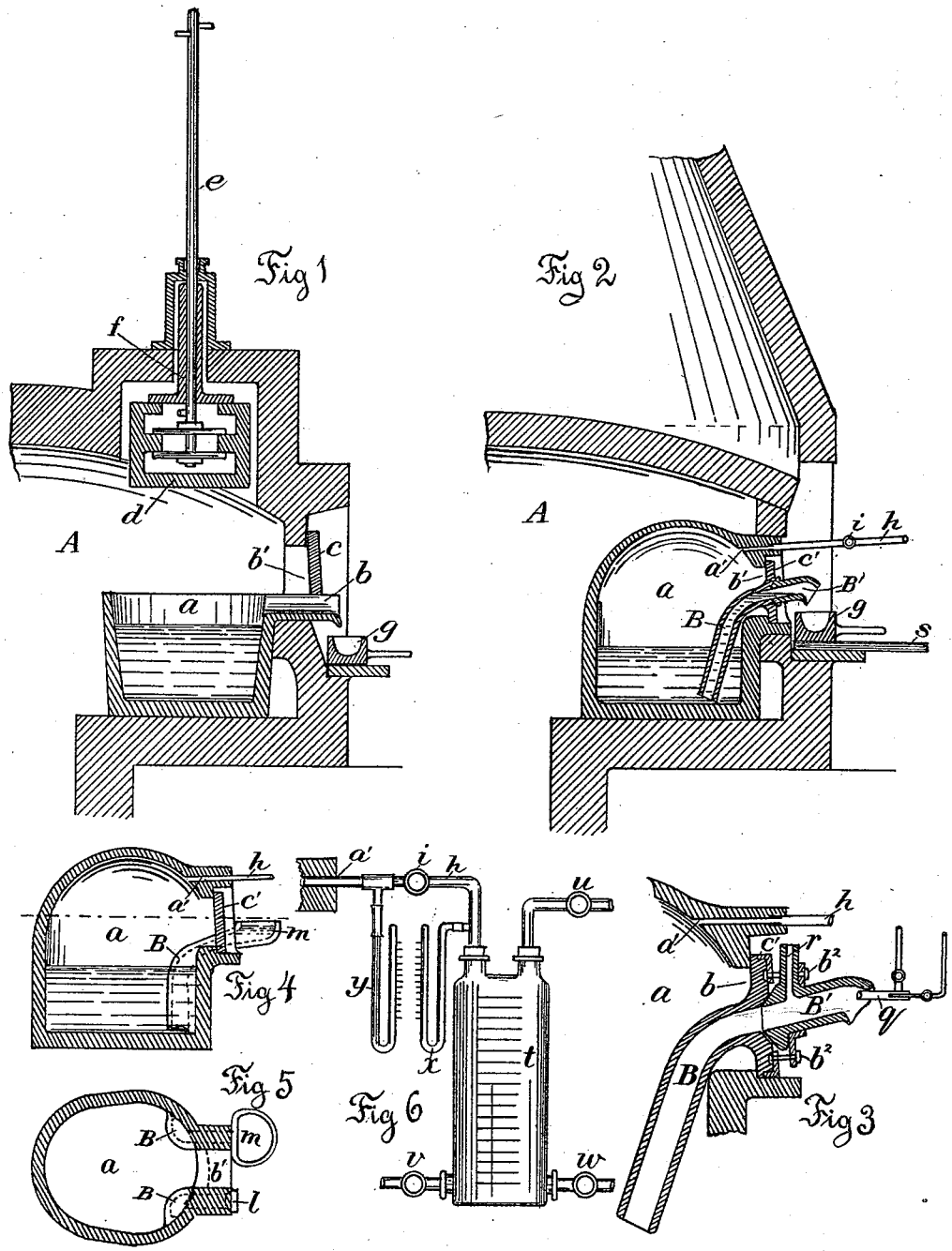
WITNESSES:
N. L. Gill.
N. B. Corwin
INVENTOR
Hermann Schulze-Berge
BY
W. Bakewell & Sons
ATTORNEYS.

UNITED STATES PATENT OFFICE.

HERMANN SCHULZE-BERGE, OF ROCHESTER, PENNSYLVANIA.

METHOD OF REMOVING MOLTEN GLASS FROM POTS.

SPECIFICATION forming part of Letters Patent No. 421,620, dated February 18, 1890.

Application filed September 1, 1888. Serial No. 284,345. (No model.)

*To all whom it may concern:*

Be it known that I, HERMANN SCHULZE-BERGE, a citizen of the Empire of Germany, and a resident of Rochester, in the county of Beaver and State of Pennsylvania, have invented a certain new and useful Improvement in Methods of Removing Molten Glass from Pots, of which the following is a specification.

The present invention refers to an improvement in the art of lifting or gathering molten glass and eventually discharging it from the melting pot or vessel in smaller or larger quantities, as required for use.

It consists in the use of pots, vats, or tanks provided with one or more discharge-openings, which are generally located above the level of the molten glass; and it consists, furthermore, in the application of displacing mediums which act upon the body of the molten glass so as to force it up to or through the discharge-opening and out of the pot or vessel.

Hitherto the method of gathering glass practiced in almost every branch of the art of glass-making consists in passing suitable tools into the molten glass contained in the melting-pot and withdrawing a quantity of glass from the pot. This operation exposes the gatherer to intense heat, and it becomes more severe and more difficult the lower the level of fluid glass gets in the pot.

The method described in this specification is an improvement on the method in use at present, in that it provides means by which, as the quantity of glass in the pot or vessel diminishes, its level can be correspondingly raised, so as to afford an easier access to the fluid glass, thereby making the work of gathering easier and more convenient for the workman; and it furthermore affords means for dispensing with certain parts or steps of the present method of gathering entirely by discharging the required quantities of molten glass into receptacles and eventually into press-molds, while the melting pot or vessel containing the glass may remain stationary.

The accompanying sheet of drawings illustrates suitable apparatus by which my improved method can be advantageously practiced.

Figure 1 represents a vertical cross-section through a part of the glass-melting furnace containing open glass-melting pots. Fig. 2 is a cross-section through a part of a glass-melting furnace containing closed or covered pots. Fig. 3 is a detail view of the discharging-opening of the furnace shown in Fig. 2. Figs. 4 and 5 represent in vertical and horizontal section a form of closed glass-melting pot having a gathering-basin outside of the pot or outside of the furnace. Fig. 6 indicates a detail referred to later on.

Similar letters of reference indicate similar parts.

In Fig. 1 I show a furnace $A$, containing an open glass-melting pot $a$, provided at its upper end with a discharge-gutter $b$, extending through the charging-hole $b'$ to the outside of the furnace. While the batch charged into the pot is being melted and clarified, the charging-opening $b'$, as well as the gutter $b$, is closed by a stopper in the usual way, the stopper protruding downward into and closing the gutter $b$. When the glass is to be discharged from the pot, the stopper is replaced by another vertically-acting stopper $c$, which rests on the top of the gutter $b$, and thus leaves the gutter open while it closes the charging-opening $b'$ above the gutter.

The discharging of the molten glass out of the pot $a$ is performed by means of displacing mediums, which may be bulky solid substances, as in the case represented by Fig. 1, or the displacing medium may be a gaseous substance confined in the pot or vessel above the molten glass. The displacing medium, as shown in Fig. 1, is a drum of refractory material $d$, which is smaller than the glass-melting pot $a$, and which during the melting operation is kept elevated in a recess in the furnace above the pot. The drum $d$ is suspended at the lower end of a rod or tube $e$ in a manner clearly shown in Fig. 1 of the drawings. The rod or tube $e$ is protected from the action of heat by a lining of refractory material $f$, and a cooling medium—such as a cold-air blast, or water—may, if desired, be circulated within the same. The drum $d$ may be lowered or raised in a manner similar to a piston or plunger in a pump by leverage or by any suitable gearing connected to the rod $e$. It is evident that if the drum $d$ be lowered and depressed into the molten glass it will displace the glass and cause it to rise to a higher level, and eventually to rise into the short gutter b and to be discharged therefrom into a receptacle placed underneath the lip of the gutter. By depressing the drum d slowly and continuously into the molten glass a continuous stream of glass will be discharged until the drum reaches the bottom of the melting-pot, while if the drum be depressed into the molten glass at intervals smaller or larger quantities will be discharged out of the melting-vessel, the amount of glass discharged depending on the depth of the depression of the drum and the corresponding degree of displacement of the fluid contents of the pot. Such method of lifting and discharging fluid glass is not well suited for gathering or discharging small quantities of glass of uniform weight as used for pressed table-ware. I prefer to use for this purpose closed glass-melting pots or closed vessels containing the molten glass, which pots or vessels are provided with discharge-tubes reaching from nearly the bottom of the pot to a place above the usual level of the glass and terminating outside of the pot and outside of the melting-furnace. In such case I apply as a displacing medium compressed air or other gaseous substance by which the fluid glass is forced pneumatically from the closed pot or vessel through the discharge-tubes and lifted to the level of the discharging mouth-piece. This construction is represented in Figs. 2 to 6.

Fig. 2 represents a vertical section through parts of a glass-melting furnace, showing a glass-melting pot with a closed top of the usual type. After melting the batch, and when the glass is to be worked out, the charging-opening b' is closed hermetically by a removable stopper c', the joints or crevices being luted and covered by a layer of semi-fluid glass.

Near the top of the pot is a small opening a', provided with a pipe h, which is fitted with valves or stop-cocks i, and through which compressed air or other gases can be forced into the closed pot to act upon the surface of the molten glass.

B is a discharge pipe or conduit which extends from within the pot, near the bottom thereof, to the outside of the pot or to the outside of the furnace. This discharge-pipe may, if desired, be passed through the stopper c', as shown in Figs. 2 and 3, in which case it is attached to or made integral with the stopper, thereby being removable with the stopper, or it may be built with the pot, forming a part of it or of its side walls, as shown in Figs. 4 and 5. The glass-melting pot or vessel may be provided with one or more of such discharge-pipes, as shown in Fig. 5, of which discharge-pipes but one is generally in use, while the outside opening of the second or other pipes may be sealed air-tight, as indicated by the plug l in Fig. 5.

Owing to the rapid chilling of fluid glass, the projection of the discharge-pipe outside of the furnace or outside of the melting pot or vessel containing the fluid glass should be short, because the fluid glass cannot be conducted far from the vessel containing it unless such discharge-pipe be provided with appliances for heating it. The latter arrangement involves the use of more or less clumsy contrivances, and I prefer, therefore, to make the discharge end outside of the melting-vessel as short as possible, and to carry the glass-receptacles, press-molds, &c., close to the vessel containing the molten glass. I prefer, however, to place a gas-burner beneath the discharge-pipe, or to arrange it so that a blast-flame of burning gas can play upon the surface of the glass in the discharge-pipe. The latter arrangement is represented in Fig. 3, which shows the discharging arrangement of Fig. 2 on a larger scale. A discharge end of a gas-burner q is placed near to or within the outer end of the discharge-pipe B, so that the flame shall play over the surface of the glass in the discharge-pipe and the gases of combustion pass off through a flue r, which extends from the side of the nozzle of the pipe B. The stoppers closing the charging-opening and the lower part of the discharge-pipe B form one single piece, and the outer piece or discharge-nozzle B' of the discharge-pipe B is detachably secured to the pipe B by screw-bolts $b^2$, or otherwise, as plainly indicated in Figs. 2 and 3 of the drawings. The outer end or discharge-nozzle of the pipe may be constructed with an overflow or lip from which the fluid glass drops off in quantities varying according to the displacement within the vessel by the compressed air, which is forced in measured quantities into the pot, and it drops directly into a press-mold or other receptacle g, placed beneath such discharge end, Figs. 1 and 2. The press mold or receptacle, after receiving the desired quantity of molten glass, is removed to the press or place of use upon slides, (indicated by the letter s, Fig. 2,) and other molds or receptacles are placed underneath the overflow or discharge end to receive their charges of molten glass at convenient intervals of time.

The receptacle g, into which the glass is discharged from the overflow, may conveniently consist of a block of wood hollowed out and charred on its surface, and if it is kept moist it can be used as a pool for gathering smaller or larger quantities of molten glass fit for use for blowing window-glass, &c. For this purpose the end of the blow-pipe is inserted into the glass contained in the receptacle, and whenever by revolving the gathering-tool in and with the glass the latter becomes of suitable consistency it is lifted out of the receptacle and subjected to the usual further treatment for conversion into the sort of glass article desired to be made.

The glass may be discharged out of the vessel containing it in a continuous flow kept up for some time, or it may be discharged intermittently in pulsatory motions. The latter mode is more applicable for the manufacture of small articles. Fig. 6 illustrates an apparatus suitable for displacing and discharging measured quantities of glass from the melting-pot. It consists of a graduated instrument $t$—such as a bottle or the like—provided with four valves or stop-cocks $u$ $i$ $v$ $w$. The stop-cock $i$ is connected with the pipe $h$, which conducts the compressed air or gas into the interior of the melting pot or vessel $a$. To this pipe $h$ is attached a pressure-gage $y$, which indicates the air-pressure within the vessel or pot $a$. The stop-cock $u$ affords communication with the open air. The stop-cock $w$ connects with a water-tank (not shown) located some distance—say from eight to ten feet—above the graduated vessel $t$, so as to be capable of compressing the air contained in the vessel $t$ with a force equivalent to about eight feet water-pressure. The stop-cock $v$ is used to discharge the water from the vessel $t$, and a pressure-gage $x$ indicates the air-pressure therein. It is evident that if the valves $u$ and $v$ are closed while the valves $i$ and $w$ are opened the air contained in the vessel $t$ is forced through the pipe $h$ into the vessel $a$ containing the glass, and by closing the valves $w$ and $i$ and opening the valves $u$ and $v$ the vessel $t$ is again filled with air, which by reversing the valves is forced into the glass-pot $a$. Whenever the air-pressure in the pot reaches the point where it balances a column of glass as high as the difference between the normal surface-level of the glass in the pot and the overflow, the fluid glass will be discharged from the pot if any more compressed air be forced thereinto. At such point the valves $i$ and $w$ are closed, and after filling the vessel $t$ with air the valve $w$ is opened and the air in the vessel $t$ is compressed until the pressure-gages $y$ and $x$ register the same pressure. The valve $i$ is then opened. The air-pressure being now the same in the vessel $t$ and pot $a$, it is evident that if a measured volume—say two, three, four, or any number of cubic inches—be forced into the pot it must displace an equal volume of fluid glass, which is discharged into the receptacle $g$. After the stop-cock $i$ is opened the required volume is gaged by the graduated marks on the vessel $t$. The valve $w$ is opened and sufficient water is allowed to enter the vessel $t$ to correspond to the desired volume of glass to be discharged from the melting pot or vessel.

Instead of gaging the fluid glass in the manner described, the glass-receptacle $g$ may be placed upon a scale or balance beneath the discharging end of the pipe or conduit B, and the amount of molten glass discharged from the pot may thus be determined by actually weighing it.

It remains to be mentioned that closed glass pots suitable for gathering glass by pneumatic displacement are best constructed as shallow as possible, since the smaller the glass column which has to be counterbalanced by the air-pressure in the pot the less is the danger of bursting the pot by internal pressure. For the same reason the pots cannot be worked when they are at a white heat. They should be allowed to cool down as much as possible. Such difficulties can be overcome by using intermediate and even transportable vessels of clay or other material, into which the fluid glass is tapped from the melting-pots. This vessel may be provided with a metallic shell and with various openings, capable of being closed air-tight, arranged in general similarly to the closed glass-melting pot with the discharging-pipe, as described above.

I claim—

1. The method of gathering or removing for further treatment molten glass from a vessel or pot situate in a heating or melting chamber, which consists in applying to the glass in such vessel or pot a displacing medium, exerting by such medium a varying pressure on the glass, thereby discharging the glass from the pot through an outlet-passage in quantities depending on the extent of the displacement, and maintaining in said chamber a melting-heat during the progress of the displacement, substantially as and for the purposes described.

2. The method of gathering or removing molten glass from a closed vessel or pot for further treatment, which consists in introducing compressed air or gas into the vessel or pot, exerting successive pressures of such air or gas on the surface of the glass, elevating the glass by such pressure through an outlet-passage, and discharging the same therefrom, substantially as and for the purposes described.

3. The method of gathering or removing molten glass from a closed vessel or pot for further treatment, which consists in introducing compressed air or gas into the vessel or pot, maintaining sufficient pressure of such air or gas on the surface of the vessel to elevate the glass to or nearly to the orifice of a discharge-opening, and introducing into the pot successive measured additions of compressed air or gas, whereby corresponding discharges of the glass are effected, substantially as and for the purposes described.

In testimony that I claim the foregoing as my invention I have signed my name, in presence of two witnesses, this 28th day of August, 1888.

HERMANN SCHULZE-BERGE.

Witnesses:
CHAS. W. HURST,
J. NEWTON DOWELL.